(12) United States Patent
Phillips

(10) Patent No.: US 11,666,144 B2
(45) Date of Patent: Jun. 6, 2023

(54) MODULAR FRAME

(71) Applicant: TRIESTE GROUP ONE LTD, Hertfordshire (GB)

(72) Inventor: Roger Phillips, Hertfordshire (GB)

(73) Assignee: TRIESTE GROUP ONE LTD, Hertfordshire (GB)

( * ) Notice: Subject to any disclaimer, the term of this patent is extended or adjusted under 35 U.S.C. 154(b) by 108 days.

(21) Appl. No.: 17/056,140

(22) PCT Filed: May 16, 2019

(86) PCT No.: PCT/GB2019/051337
§ 371 (c)(1),
(2) Date: Nov. 17, 2020

(87) PCT Pub. No.: WO2019/220116
PCT Pub. Date: Nov. 21, 2019

(65) Prior Publication Data
US 2021/0307508 A1 Oct. 7, 2021

(30) Foreign Application Priority Data

May 18, 2018 (GB) ..................................... 1808120

(51) Int. Cl.
*A47B 47/00* (2006.01)
*F16B 7/04* (2006.01)

(52) U.S. Cl.
CPC ........ *A47B 47/0016* (2013.01); *F16B 7/0413* (2013.01); *F16B 7/0453* (2013.01); *F16B 7/0486* (2013.01)

(58) Field of Classification Search
CPC .. A47B 47/0016; F16B 7/0413; F16B 7/0453; F16B 7/0486
See application file for complete search history.

(56) References Cited

U.S. PATENT DOCUMENTS

| | | | |
|---|---|---|---|
| 2,604,342 A | 7/1952 | Holmes | |
| 3,338,602 A * | 8/1967 | Arnd | F16B 7/0473 411/913 |
| 3,563,581 A * | 2/1971 | Sommerstein | F16B 7/0486 403/217 |

(Continued)

FOREIGN PATENT DOCUMENTS

| | | |
|---|---|---|
| DE | 7611916 U1 | 10/1976 |
| DE | 8202245 U1 | 6/1982 |

(Continued)

OTHER PUBLICATIONS

International Search Report dated Jun. 20, 2019 in PCT/GB2019/051377, 3 pages.

(Continued)

*Primary Examiner* — Stanton L Krycinski
(74) *Attorney, Agent, or Firm* — Lewis Roca Rothgerber Christie LLP

(57) ABSTRACT

A modular frame comprising a connector (3), a first frame member (1, 2) and a second frame member (1, 2), wherein the first frame member (1, 2) comprises one or more engagement members (5, 7) profiled to key with a first slot (6) on the connector (3) and a second slot (8) on the second frame member (1, 2).

17 Claims, 5 Drawing Sheets

(56) References Cited

U.S. PATENT DOCUMENTS

| | | | | |
|---|---|---|---|---|
| 3,747,965 | A | * | 7/1973 | Wing .................. F16B 12/42 403/252 |
| 3,811,785 | A | * | 5/1974 | Hagglund ............. F16B 7/0453 403/231 |
| 3,834,549 | A | * | 9/1974 | Burg .................. A47B 47/0016 403/175 |
| 4,352,587 | A | * | 10/1982 | Milz ................... A47B 57/408 403/252 |
| 4,501,512 | A | * | 2/1985 | Hiltz .................. F16B 12/18 403/170 |
| 4,527,364 | A | | 7/1985 | Baus |
| 5,536,097 | A | * | 7/1996 | Hazan ............... A47B 47/0016 403/231 |
| 5,893,249 | A | * | 4/1999 | Peterson ............... E04B 9/122 52/506.07 |
| 6,273,633 | B1 | * | 8/2001 | Husson ............... F16B 12/40 403/171 |
| 8,057,120 | B2 | | 11/2011 | Wernlund ............. F16B 7/18 403/264 |
| 9,458,874 | B2 | * | 10/2016 | Sim ..................... F16B 7/20 |
| 9,546,675 | B2 | * | 1/2017 | Evitt .................... E04B 1/5831 |
| 9,833,692 | B2 | * | 12/2017 | Pavey .................. F16B 7/0486 |
| 10,244,864 | B2 | * | 4/2019 | Bensen ................. F16B 9/05 |
| 2009/0026163 | A1 | * | 1/2009 | Lee ...................... F16B 5/0052 211/189 |
| 2010/0008715 | A1 | * | 1/2010 | Minowa .............. F16B 7/0453 403/203 |
| 2015/0377414 | A1 | * | 12/2015 | Pirseyedi ............. F16B 7/0466 403/205 |

FOREIGN PATENT DOCUMENTS

| | | | | |
|---|---|---|---|---|
| DE | 3319627 | A1 | | 12/1984 |
| DE | 4142953 | A1 | | 7/1993 |
| DE | 29706495 | U1 | * | 7/1997 ......... A47B 47/0016 |
| EP | 0695881 | A2 | * | 2/1996 |
| FR | 2262217 | A1 | * | 9/1975 |
| FR | 2753241 | A1 | * | 3/1998 ............. A47B 13/06 |
| GB | 1141941 | A | * | 2/1969 |
| NL | 1008901 | C1 | * | 10/1999 |
| WO | WO 01/01533 | A1 | | 1/2001 |

OTHER PUBLICATIONS

Written Opinion of the International Searching Authority dated Jun. 20, 2019 in PCT/GB2019/051377, 6 pages.
Search Report dated Nov. 12, 2018 issued in GB1808120.8, 1 sheet.

* cited by examiner

MODULAR FRAME

CROSS-REFERENCE TO RELATED APPLICATION(S)

This application is a National Phase entry of PCT/GB2019/051337 filed May 16, 2019, which claims priority to and the benefit of GB Patent Application No. 1808120.8, filed May 18, 2018, the entire contents of both of which are incorporated herein by reference.

The present disclosure relates to a modular frame, in particular to such a modular frame that may be used as or integrated into furniture.

Over time office spaces have evolved. Modern offices often feature large open plan spaces. It can be desirable to provide defined spaces within these open plan environments without entirely separating those spaces from one another. For this purpose modular zone dividers have been used, which are fully customisable and are built up as a modular frame comprising a series of interconnected open cubes, some of which may be provided with shelving, cupboards or otherwise.

Issues have, however, arisen from the construction of these structures, wherein the use of specialist, skilled, installers has been required.

The present invention arose in a bid to provide an improved modular frame that was easy to assemble.

According to the present invention in a first aspect, there is provided a modular frame comprising a connector, a first frame member and a second frame member, wherein the first frame member comprises one or more engagement members profiled to key with a first slot on the connector and a second slot on the second frame member.

The first frame member most preferably comprises a first engagement member profiled to key with the first slot and a second engagement member profiled to key with the second slot.

The modular frame of the present invention is ideally suited in the construction of modular zone dividers. However, the invention is not to be limited in this regard. Modular frames constructed in accordance with the present invention may be used in the construction of various alternative forms or furniture. Moreover, the modular frame may find application outside the furniture art, as will be readily appreciated by those skilled in the art.

Further, preferred, features of the modular frame according to the above aspect are presented in the dependent claims.

Embodiments of the inventions are described below with reference to the accompanying drawings, in which.

Figure 9:
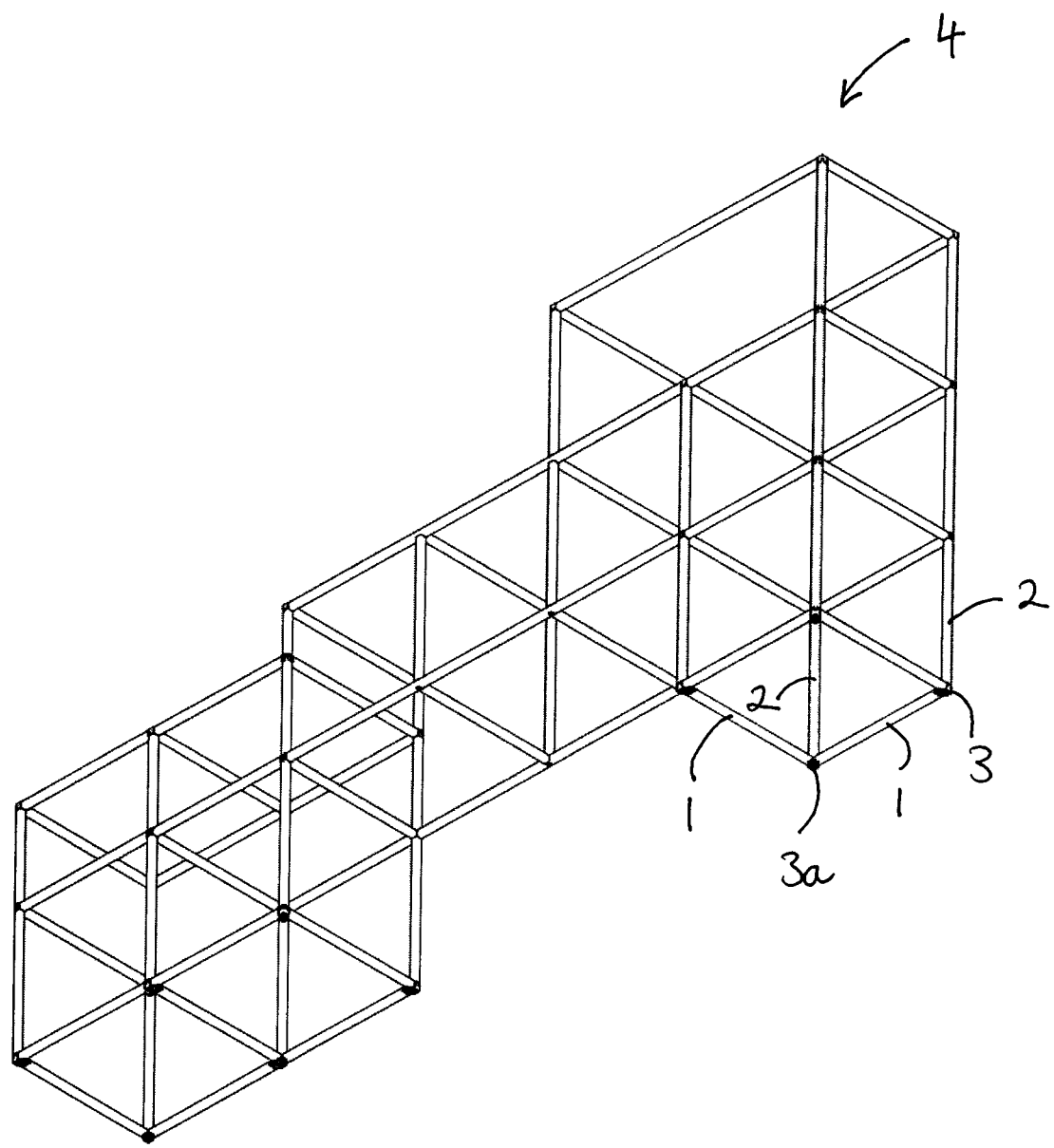
FIG. 9 shows a modular frame in accordance with an embodiment of the present invention.

With reference to FIG. 9, there is shown an exemplary modular frame 4 in accordance with the present invention. It comprises a plurality of first frame members 1, a plurality of second frame members 2 and a plurality of connectors 3. The connectors 3 are provided at junctions between adjacent first and second frame members 1, 2, some only of which are shown labelled. The first and second frame members 1, 2 are elongate members. The longitudinal axes of the first and second frame members 1, 2 preferably extend perpendicular to one another. In the present, exemplary arrangement, the first frame members 1 extend horizontally and the second frame members 2 extend vertically. However, this need not be the case. The orientations could be flipped, for example. The exemplary modular frame 4 shown comprises a plurality of interconnected open-sided cubes. Numerous frame structures in accordance with the principles of the present invention will be conceivable by those skilled in the art, which may be two or three dimensional in form and may comprise any desired combination of first and second frame members 1, 2 and connectors 3. The present invention is not to be specifically limited in this regard.

The modular frame 4 will, however, always comprise at least one connector 3, which joins a first frame member 1 with a second frame member 2. Accordingly, with reference to FIGS. 1 to 8, in its broadest sense, the invention comprises a modular frame 4 comprising a connector 3, a first frame member 1 and a second frame member 2, wherein the first frame member 1 comprises one or more engagement members 5, 7 profiled to key with a first slot 6 on the connector and a second slot 8 on the second frame member.

Figure 1:
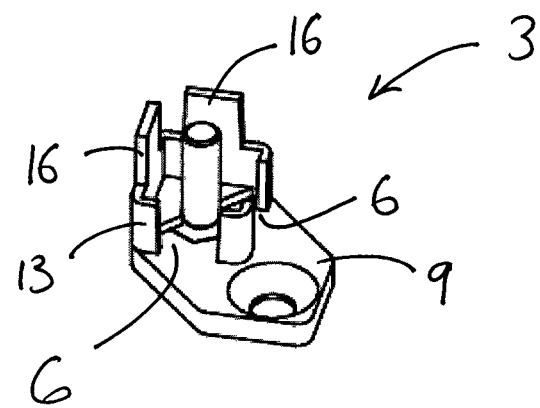
FIG. 1 shows a perspective view of a connector for a modular frame according to a first embodiment of the present invention.
Figure 6:
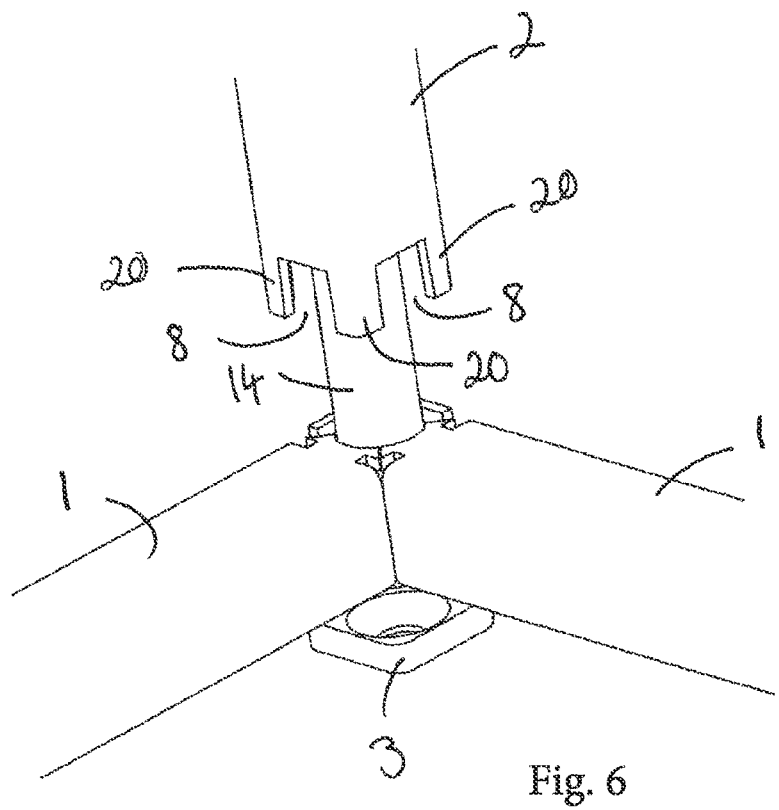
FIG. 6 shows a perspective view of the arrangement of FIG. 5 with a second frame member introduced but not seated.
Figure 7:
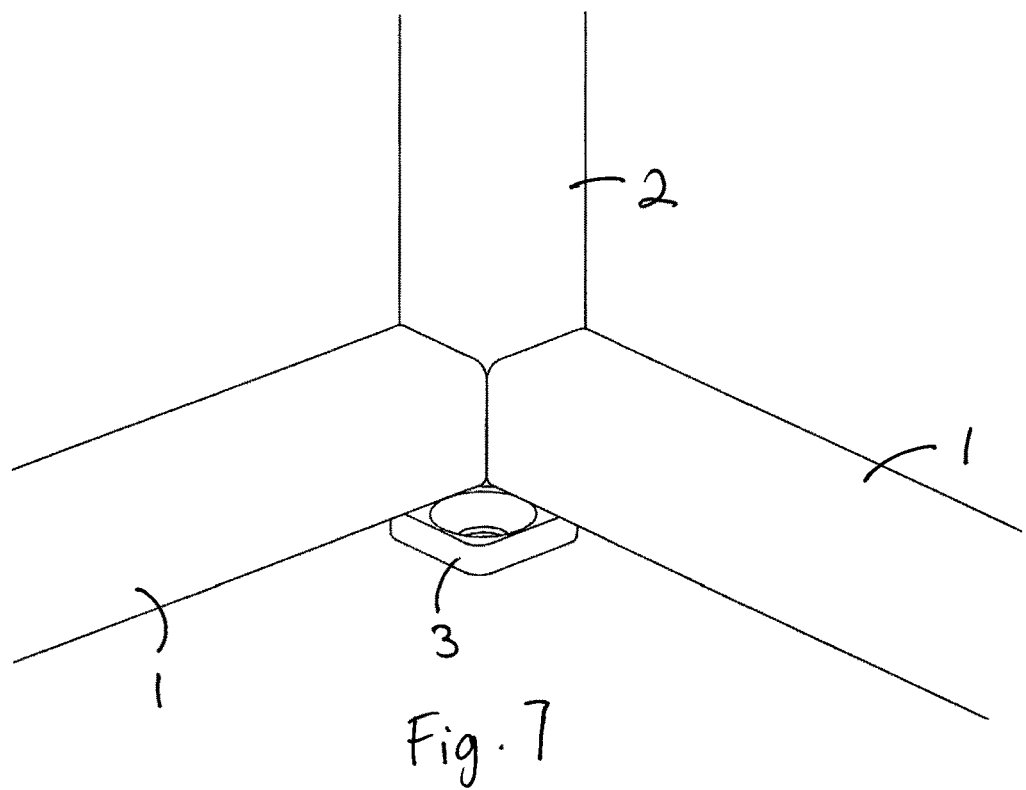
FIG. 7 shows a perspective view of the arrangement of the arrangement of FIG. 6 with the second frame member seated.
Figure 8:
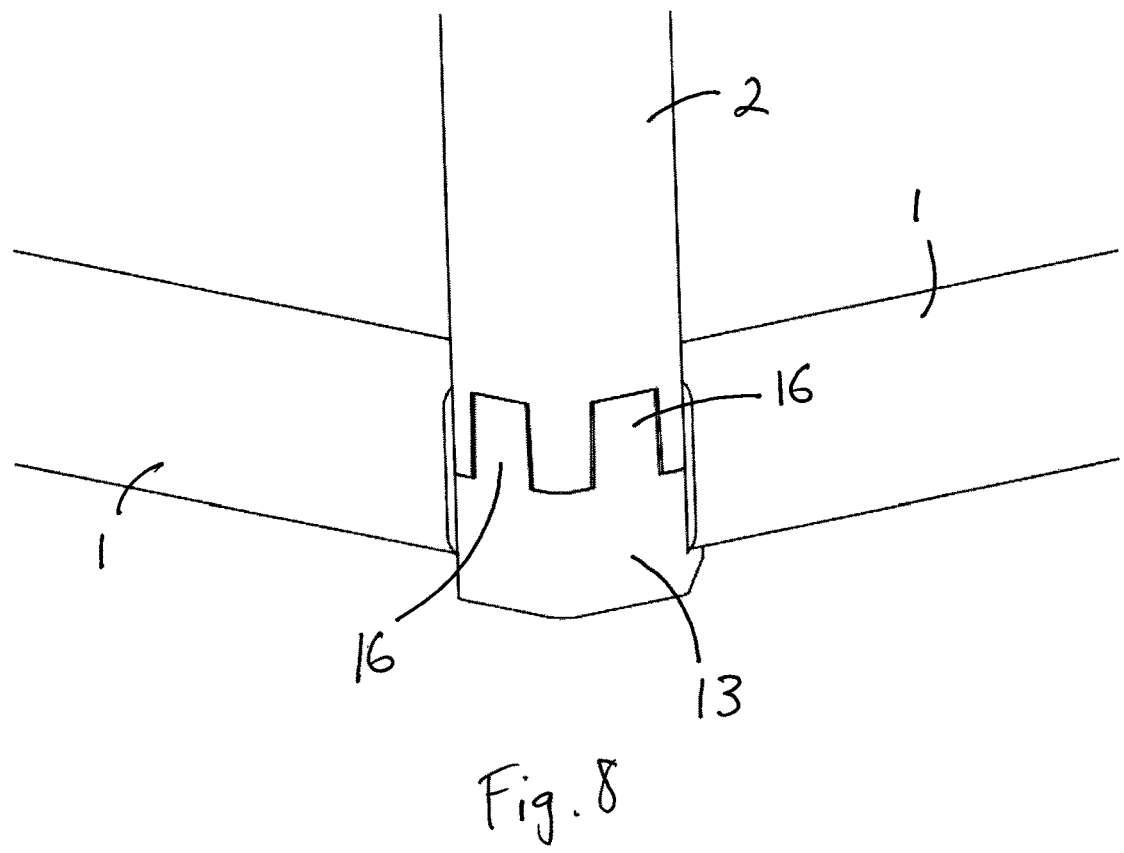
FIG. 8 shows an alternative perspective view to FIG. 7.

With reference to FIG. 1, there is shown a single connector 3. The connector 3 is a bottom corner connector of the frame 4 of FIG. 9. It could comprise the connector labelled as 3a in FIG. 9. FIGS. 1 through 8 show a connection sequence of a single corner joint of the frame 4, with FIG. 1 showing the connector 3 alone and FIGS. 7 and 8 showing a fully formed bottom corner joint of the modular frame 4 formed using the connector 3.

In dependence on the position of any of the connectors 3 within the modular frame 4, and the form of the frame itself, the connector structures may vary. For example, whilst the connector 3a, as a bottom corner connector, joins two of the first frame members 1 at right angles to one another and a single second frame member 2 perpendicular to the first frame members 1, 2, other connectors will be adapted to join more or less frame members and/or to join frame members in different relative orientations. As an example, connectors 3 may be included as part of a modular frame 4, which connect one, two, three or four of the first frame members 1 and one, two or none of the second frame members 2, with various orientations possible amongst those combinations of frame members.

The connector 3, as a corner connector comprises two slots 6. In line with the discussion above, the connector will preferably comprise the same number of slots as the number of first frame members 1 are to be connected to the joint comprising the connector 3, wherein a suitable range of different connectors will be provided. Regardless of the number of slots 6, the slots 6 are preferably formed by one or more first projections 13. The first projections 13 project from a body 9 of the connector 3. They are arranged such that they define the periphery of a shape that has the same profile as the second frame member 2. In the present arrangement, this is a square. It could in alternative arrangements be a different shape, including a different polygonal shape, in line with the discussion below. The periphery of the square is aligned with the outer profile of the second frame member 2, as best seen in FIGS. 6 and 7.

Whilst the present connector 3 is single sided for a base joint of the frame upon which the frame is supported, alternative connectors will be double sided to support upper and lower second frame members 2.

The connector 3 comprises a threaded element 10, which in the present arrangement comprises a bolt. The threaded element projects from the body 9 of the connector 3. It is provided centrally within the periphery defined by the first protrusions 13. It extends in axial alignment with the longitudinal axis of the second frame member 2.

In the present arrangement the first and second frame members 1, 2 are hollow, which is preferable. They have a square profile, which is also preferable. In such an arrangement they define square tubes. In alternative arrangements, the first and second frame members could have profiles that are other than square. For example, they could have alternative polygonal profiles, including, but not limited to, triangular, pentagonal or hexagonal. Moreover, they could be solid instead of hollow. The first and second frame members 1, 2 are preferably connected to the joints of the frame 4 at each of their opposed ends, as seen in FIG. 9.

The first and second engagement members 5, 7 on the first frame member 1 are preferably formed as tabs, as shown, which extend from the end of the first frame member 1. In alternative arrangements, a single engagement member could be provided, which may extend through the depth of the first frame member 1. Whether there are one or two engagement members, they will be profiled to key with the first slots 6 of the connector 3 and the second slots 8 of the second frame member 2. For such purpose numerous profiles will be readily appreciated by those skilled in the art and the form of the engagement members is not to be particularly limited in this regard. In the present arrangement, however, the engagement members 5, 7 comprise a neck portion 11 and an enlarged head portion 12. The neck portion 11 is received by the slots 6, 8 with the head being trapped by the slot, such that the first frame member 1 is trapped against movement along its longitudinal axis. Where there are two engagement members 5, 7 provided, the engagement member 5, which engages with the first slot 6 in the connector 3 preferably has a larger area than the other engagement member 7, which allows it to be clamped against the body 9 of the connector 3, as discussed below. Regardless of the form of the engagement members it is preferable that one or more engagement members are provided at both ends of the first frame member to allow connection at its opposed longitudinal ends to adjacent joints of the frame 4.

In the present arrangement, four second slots 8 are provided on the second frame member 2. This represents a slot 8 per side of the second frame member 2. The end of the second frame member 2 is thereby castellated with the second slots 8 formed by the castellations. The second slots 8 are defined between second projections 20, which preferably comprise corner posts as shown. The corner posts wrap around the corners of the second frame member 2 in profile. With a square profile, they have first and second portions arranged at 90 degrees to one another. With non-square profiles, the angles will change. Whilst the number of second slots 8 may be equal to the number of sides of the second frame member 2 as in the present arrangement, which is preferable to allow for a universal second frame member that may be used with any of the variously arranged connectors 3, it could include only the required number of slots for the number of first frame members 1 that are connected at the relevant joint 3, obviating the need for blanking tabs, as will be discussed further below. It is again preferable that the slots 8 are provided at both ends of the first frame member to allow connection at its opposed longitudinal ends to adjacent joints of the frame 4.

The first and second engagement members 5, 7 and the second slots 8 may be may be formed by cutting the ends of the first and second frame members 1, 2 respectively.

The formation of a joint of the frame 4 using the connector 3, first frame members 1 and second frame member 1 will now be discussed with further discussion of additional preferred features.

Figure 2:
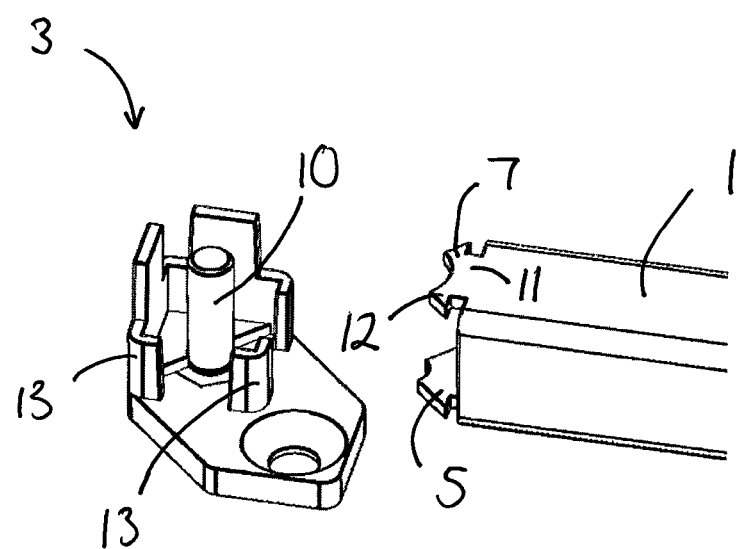
FIG. 2 shows a perspective view of the connector of FIG. 1 and a first frame member.
Figure 3:
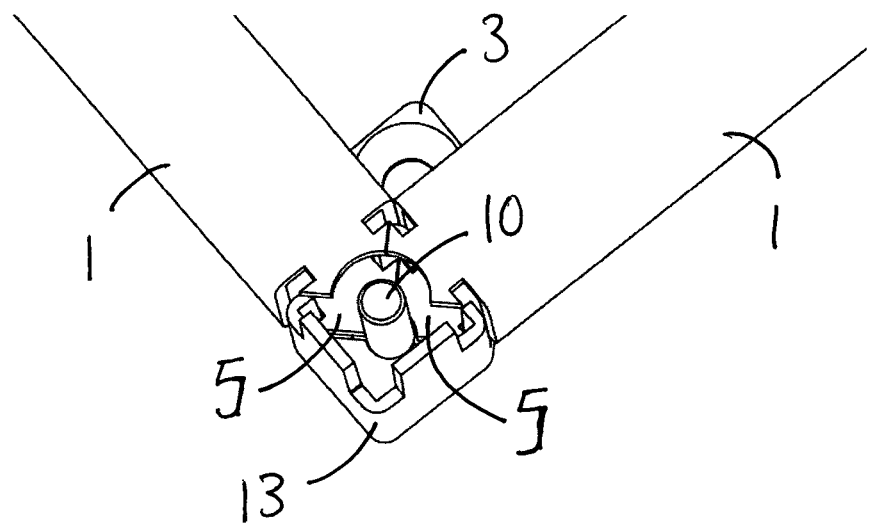
FIG. 3 shows a perspective view from above of the connector of FIG. 1 connected to a pair of first frame members.
Figure 4:
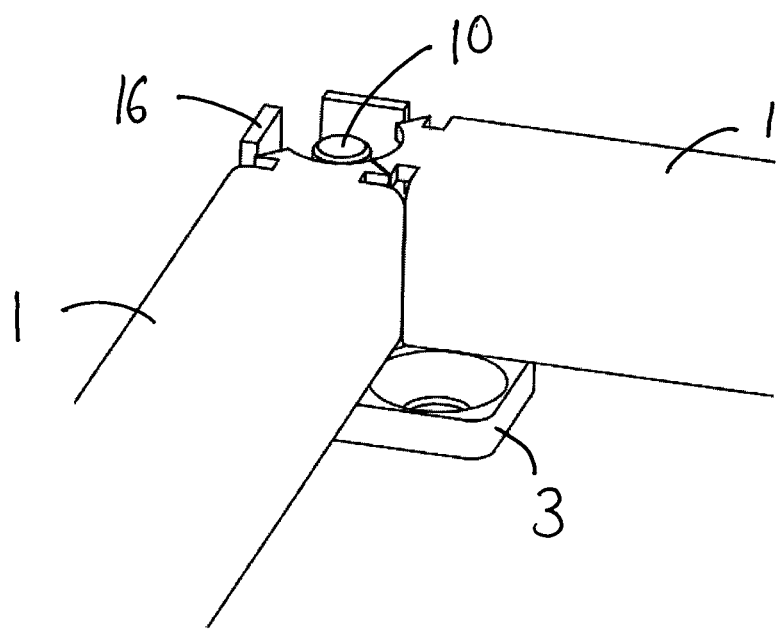
FIG. 4 shows an alternative perspective view to FIG. 3.

FIGS. 2 to 4 show the engagement of the first frame members 1 with the connector 3. The engagement members 5 are keyed with the first slots 6. The neck portions 11 are slidably received by the first slots 6 with the enlarged head portions 12 trapped. The engagement members 7 are free from engagement with the first slots 6, they are vertically spaced from the first slots 6 and the first protrusions 13. In the alternative arrangement of a single deeper engagement member, a lower part of the engagement member would engage the first slot 6 whilst an upper part vertically above the first slot 6 would remain free for subsequent engagement with the second slot 8 of the second frame member 2. In either arrangement, the first frame members 1 are locked against movement along their longitudinal axes.

Figure 5:
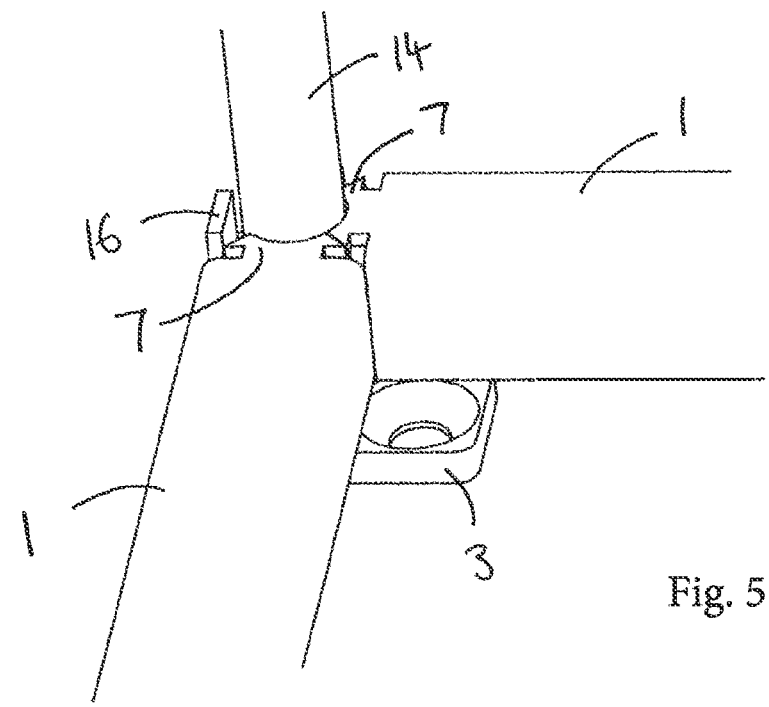
FIG. 5 shows a perspective view of the arrangement of FIGS. 3 and 4 with a clamping member in the form of a rod introduced.

In FIG. 5, a clamping member 14 is introduced which clamps the engagement members 5 against the connector 3. With this clamping, the first frame members 1 are locked against any relative movement with the connector 3. The clamping member is threaded and engages the threaded element 10 of the connector 3. In the present arrangement, as is preferred, the clamping member 14 comprises a rod that extends through the second frame member 2, as shown in FIG. 5. The clamping member 14 is not limited to such a form, however. For example, it may not comprise a rod and/or may not extend through the second frame member 2. The rod is threaded at a first end for engaging with the threaded element 10 at the connector and is preferably threaded at its opposed end for engaging with a corresponding further threaded element. The further threaded element may be provided at a further joint or connector. The further threaded element may comprise a threaded first end of a further rod. Dependent on the form of the further threaded element, the further threaded element itself or a locking element engaged thereby may engage an opposed end of the second frame member 2 to the end that engages the connector 3 to lock the second frame member 2 in place. The locking member could, for example, comprise a further connector 3, an end piece, or otherwise. In the present arrangement, the smaller engagement members 7 are not clamped by the rod. In alternative arrangements, the engagement members 7 could be clamped, for example, if they were larger. Also, in the arrangement mentioned above with a single engagement member, having a sufficient depth to key with both the first slot 6 in the connector 3 and the second slot 8 in the second frame member 2, this engagement member would be clamped against the connector.

In FIG. 6, the second frame member 2 is introduced. FIGS. 7 and 8 show the second frame member 2 seated. The second slots 8 key with the engagement members 7. The first slots 6 and projections 13 on the connector 3 and the second slots 8 and projections 20 on the second frame member 2 are aligned with one another. The second projections 20 abut the projections 13 and are supported thereby. Lower faces of the second projections 20 are supported by upper surfaces of the first projections 13.

In order to fill any of the second slots 8 in the second frame members 2, which do not engage with a first frame member 1, and to avoid unsightly gaps/openings in the modular frame 4, the connector 3 may be provided with blanking tabs 16 to be aligned with the unfilled second slots 8 and to fill these second slots 8, as best seen in FIG. 8. These blanking tabs 16 may project from the upper surfaces of the one or more first projections 13 on the connector 3. They will not be required if the second frame members 2 are provided with only the required second slots 8 for the respective joint to be formed. However, the use of standardised second frame members 2 will generally be preferred, with a range of suitably configured connectors 3 provided that include the blanking tabs 18 as necessary.

The invention claimed is:

1. A modular frame comprising a connector, a first frame member and a second frame member, wherein the first frame member comprises a first engagement member profiled to key with a first slot on the connector and a second engagement member profiled to key with a second slot on the second frame member, each of the engagement members comprises a neck portion and an enlarged head portion, and at least one of the engagement members is clamped against the connector by a clamping member, wherein the connector comprises one or more first projections which define the first slot and the second frame member comprises one or more second projections which define the second slot, and wherein the one or more first projections define the periphery of a shape that has a same profile as the second frame member.

2. A modular frame comprising a connector, a first frame member and a second frame member, wherein the first frame member comprises a first engagement member profiled to key with a first slot on the connector and a second engagement member profiled to key with a second slot on the second frame member, each of the engagement members comprises a neck portion and an enlarged head portion, and at least one of the engagement members is clamped against the connector by a clamping member, wherein the connector comprises one or more first projections which define the first slot and the second frame member comprises one or more second projections which define the second slot, and wherein the second frame member comprises a plurality of the second projections, which define castellations.

3. A modular frame as claimed in claim 1, wherein the first and/or second projections comprise one or more corner posts.

4. A modular frame as claimed in claim 1, wherein the first and second projections are aligned with one another.

5. A modular frame as claimed in claim 1, wherein the first and second projections abut with one another.

6. A modular frame as claimed in claim 1, wherein the first and second slots are aligned with one another.

7. A modular frame comprising a connector, a first frame member and a second frame member, wherein the first frame member comprises a first engagement member profiled to key with a first slot on the connector and a second engagement member profiled to key with a second slot on the second frame member, each of the engagement members comprises a neck portion and an enlarged head portion, and at least one of the engagement members is clamped against the connector by a clamping member wherein the clamping member is threaded and engages a corresponding threaded element at the connector, wherein the clamping member comprises a rod that extends through the second frame member, and wherein the rod is threaded at a first end for engaging with the threaded element at the connector and is threaded at an opposed second end for engaging with a corresponding further threaded element.

8. A modular frame as claimed in claim 7, wherein the further threaded element is provided at a further connector.

9. A modular frame as claimed in claim 7, wherein the further threaded element comprises a threaded first end of a further rod.

10. A modular frame as claimed in claim 7, wherein the further threaded element itself or a locking element engaged thereby engages an opposed end of the second frame member to the end that engages the connector to lock the second frame member in place.

11. A modular frame as claimed in claim 1, wherein the first and second engagement members are aligned with one another.

12. A modular frame as claimed in claim 1, wherein the first engagement member has a greater footprint than the second engagement member and is clamped against the connector by the clamping member.

13. A modular frame as claimed in claim 1, wherein the first and second frame members are elongate members, which are perpendicular to one another.

14. A modular frame as claimed in claim 1, wherein a plurality of first frame members are connected to the connector.

15. A modular frame as claimed in claim 14, wherein the plurality of first frame members are perpendicular to one another.

16. A piece of furniture comprising a modular frame as claimed in claim 1.

17. A piece of furniture as claimed in claim 16, which comprises a modular zone divider.

* * * * *